United States Patent
Chamberlain

(10) Patent No.: US 9,561,457 B2
(45) Date of Patent: Feb. 7, 2017

(54) BOTTOM FILTER FRAME TAB RELIEF

(71) Applicant: KOCH FILTER CORPORATION, Louisville, KY (US)

(72) Inventor: Brent Chamberlain, Louisville, KY (US)

(73) Assignee: KOCH FILTER CORPORATION, Louisville, KY (US)

( * ) Notice: Subject to any disclaimer, the term of this patent is extended or adjusted under 35 U.S.C. 154(b) by 234 days.

(21) Appl. No.: 14/104,959

(22) Filed: Dec. 12, 2013

(65) Prior Publication Data

US 2015/0165359 A1 Jun. 18, 2015

(51) Int. Cl.
*B01D 46/00* (2006.01)
*B23P 19/04* (2006.01)
*B01D 46/10* (2006.01)

(52) U.S. Cl.
CPC ......... *B01D 46/0016* (2013.01); *B01D 46/001* (2013.01); *B01D 46/0005* (2013.01); *B01D 46/10* (2013.01); *B23P 19/04* (2013.01)

(58) Field of Classification Search
CPC ............ B01D 46/0016; B01D 46/0005; B01D 46/001; B01D 46/10; B23P 19/04; B65H 45/30
See application file for complete search history.

(56) References Cited

U.S. PATENT DOCUMENTS

| | | | |
|---|---|---|---|
| 3,992,173 A * | 11/1976 | Wharton | B01D 46/0002 156/216 |
| 4,323,379 A * | 4/1982 | Shearin | B01D 46/10 55/511 |
| 4,349,147 A | 9/1982 | Jensen | |
| 4,570,844 A | 2/1986 | Wysocki | |
| 4,769,934 A | 9/1988 | Dolce | |
| 7,537,632 B2 | 5/2009 | Miller et al. | |
| 8,500,839 B2 | 8/2013 | Crabtree et al. | |
| 8,834,592 B1 * | 9/2014 | Dimicelli | B01D 46/0013 55/483 |
| 2004/0148915 A1 * | 8/2004 | Lipner | B01D 46/0002 55/495 |
| 2007/0204574 A1 | 9/2007 | Workman | |

* cited by examiner

*Primary Examiner* — Amber R Orlando
*Assistant Examiner* — Britanny Precht
(74) *Attorney, Agent, or Firm* — Jackson Walker LLP; Christopher J. Rourk

(57) ABSTRACT

A frame comprising a first folding side portion attached to a body and a second folding side portion attached to the body adjacent to the first folding side portion. The first folding side portion further comprises a tab adjacent to the second folding side portion. The second folding side portion further comprises a hole adjacent to the first folding side portion, wherein the tab is configured to fit into the hole without folding when the first folding side portion is arranged perpendicular to the second folding side portion and the first folding side portion and the second folding side portion are each perpendicular to the body.

20 Claims, 2 Drawing Sheets

BOTTOM FILTER FRAME TAB RELIEF

TECHNICAL FIELD

The present disclosure relates generally to frame assemblies, and more specifically to a bottom filter frame tab relief that allows a frame to be readily assembled.

BACKGROUND OF THE INVENTION

Frames for air filters are generally assembled by using glue or other fastening materials, or by complex slot configurations that require a significant amount of handling for assembly.

SUMMARY OF THE INVENTION

A frame is provided that includes a first folding side portion attached to a body and a second folding side portion attached to the body adjacent to the first folding side portion, such as on two adjacent sides of a rectangle. The first folding side portion further comprises a tab adjacent to the second folding side portion, where the tab can be formed by separating the first side portion from the second side portion and by further cutting the corner from the first side portion. The second folding side portion further comprises a hole adjacent to the first folding side portion, wherein the tab is configured to fit into the hole without folding when the first folding side portion is arranged perpendicular to the second folding side portion and the first folding side portion and the second folding side portion are each perpendicular to the body. The hole can have a trapezoidal shape (or other suitable shape) that allows the tab to be slid into the hole when the frame sides are being assembled, without requiring an assembler to fold the tab or otherwise manipulate the tab or the slot.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
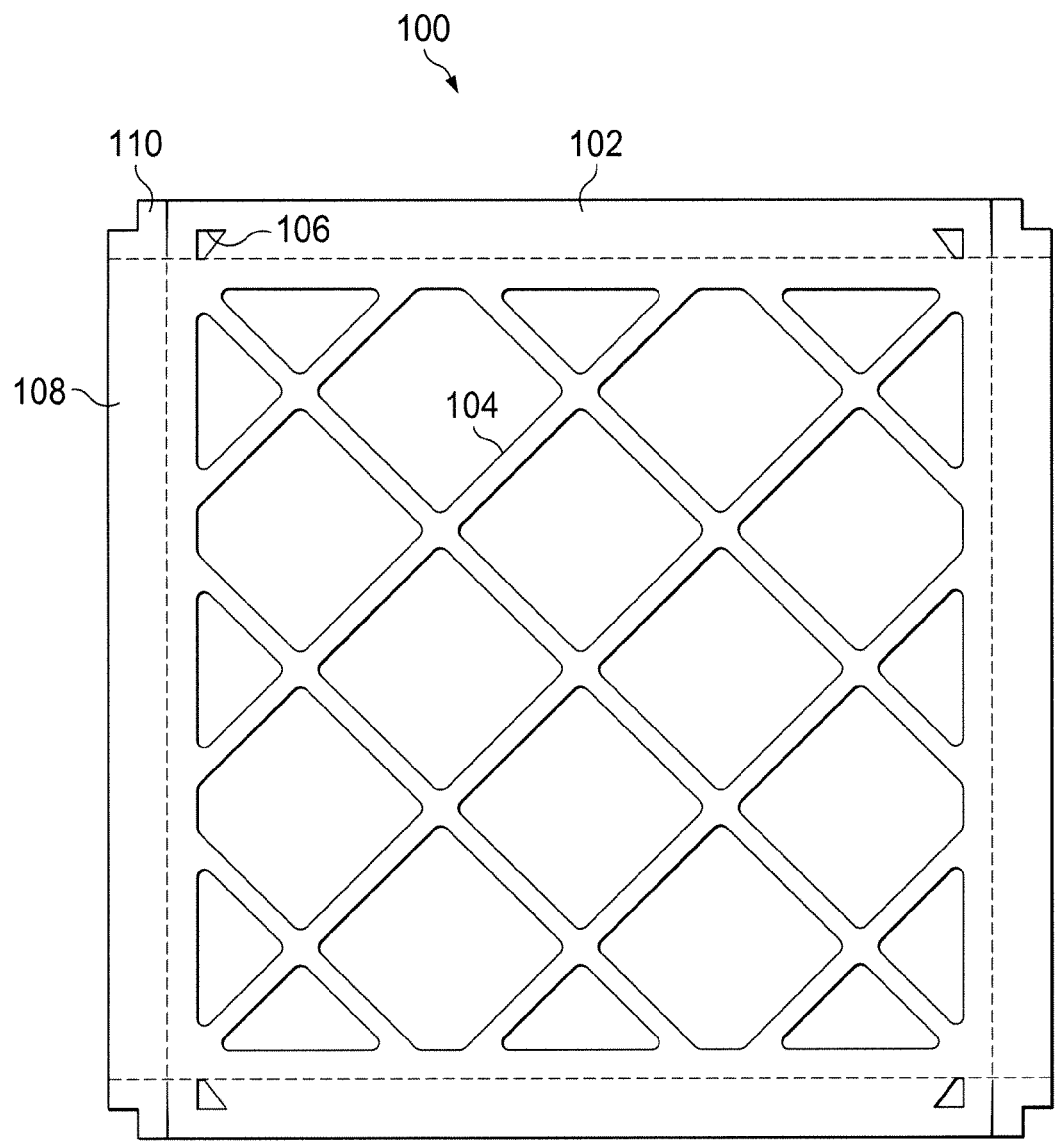
FIG. 1 is a diagram of a frame for a filter assembly in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a frame 100 for a filter assembly in accordance with an exemplary embodiment of the present disclosure. Frame 100 can be one half of the filter assembly, where a second frame half is used to hold filter material in place for placement in an air duct, or for other suitable purposes.

Frame 100 can be made from cardboard, corrugated cardboard, plastic sheet, corrugated plastic sheet, sheet metal, felt, paperboard, wire cloth, beverage board, solid unbleached sulfate (SUS) paperboard, coated natural kraft (CNK) paperboard, Duraframe, Kraftpack, solid bleached sulfate boxboard (SBS); clay coated news back (CCNB), uncoated recycled board or other suitable materials, and includes first frame side 102, second frame side 108 and cross members 104. First frame side 102 includes holes 106, which can be formed by cutting, punching, dies or in other suitable manners. Second frame side 108 includes tabs 110, which can be easily inserted into holes 106, and which do not need to be aligned, inserted into a hole or otherwise manipulated in order to form a finished frame. Holes 106 are used in place of slots, which require a significant amount of manual manipulation in order to be assembled, which significantly increases labor costs. Tabs 110 can be secured in holes 106 by glue, a staple or staples, tape, epoxy, an adhesive, rubber cement, a clip or in other suitable manners. Tabs 110 can be formed by cutting, punching, dies or in other suitable manners to separate frame 100 between the first frame side 102 and the second frame side 108 along a fold line that is used to fold the first frame side 102 into position in use, or in other suitable manners. Cross members 104 can be formed by cutting, punching, dies or in other suitable manners to form a diamond pattern, a quadrilateral pattern, an ornate pattern, a pattern that is optimized to increase a flow of air through filter material that has been placed within frame 100, a pattern that is optimized to provide a predetermined amount of support to filter material that has been placed within frame 100 when a predetermined volume of air is flowing through the filter material, or other suitable patterns.

Figure 2:
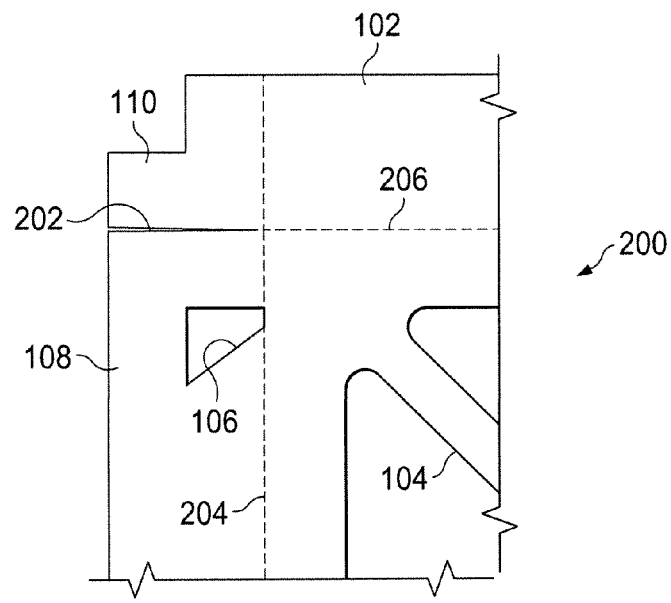
FIG. 2 is a detail of the frame in accordance with an exemplary embodiment of the present disclosure.

FIG. 2 is a detail 200 of frame 100 in accordance with an exemplary embodiment of the present disclosure. As shown in detail 200, a cut 202 is made between first frame side 102 and second frame side 108. Second frame side 108 is first folded at fold 204, which can include scoring or other material processing to facilitate the folding of second frame side 108. First frame side 102 is then folded at fold 206, which can also include scoring or other material processing to facilitate the folding of first frame side 102.

Figure 3:
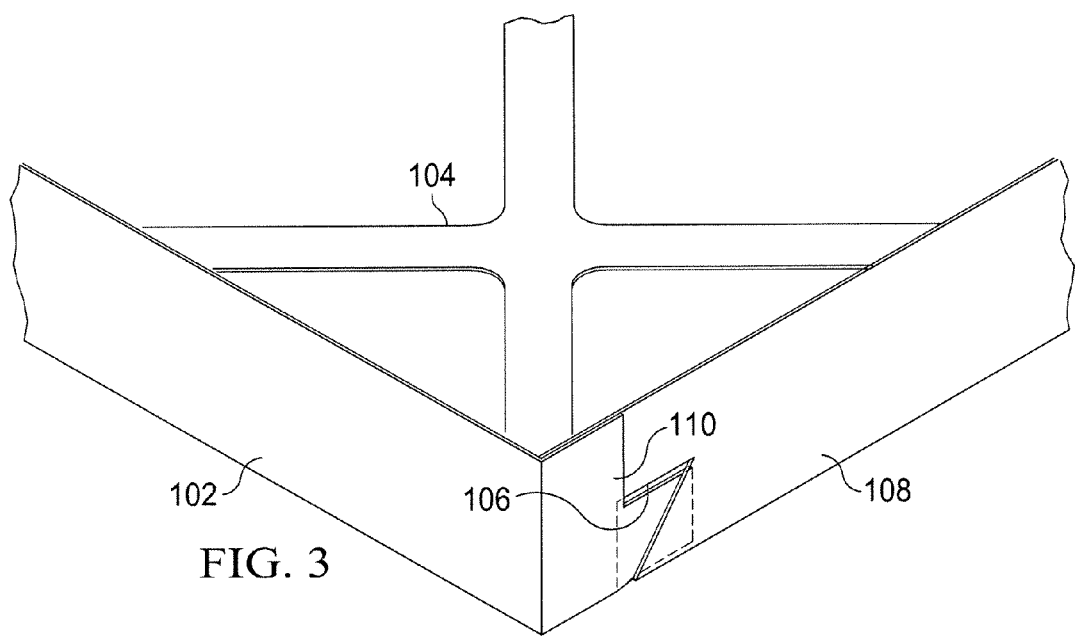
FIG. 3 is a diagram of the frame as assembled, in accordance with an exemplary embodiment of the present disclosure.

FIG. 3 is a diagram of frame 100 as assembled, in accordance with an exemplary embodiment of the present disclosure. Frame 100 as assembled includes first frame side 102 folded up, with tab 110 bent around second frame side 108 to form a corner. Tab 110 is inserted into cutout 106, and cross members 104 are disposed underneath the assembled frame 100.

A method of manufacturing a frame is provided, where the frame includes a first folding side portion that is attached to a body and a second folding side portion attached to the body adjacent to the first folding side portion, such as at a corner of the body or in other suitable configurations. The first folding side portion includes a tab at the end of the first folding side portion that is adjacent to the second folding side portion. The tab can be formed by cutting or separating the first folding side portion from the second folding side portion, such as along a fold line that is scored or otherwise processed to allow the first folding side portion to be readily folded into position during assembly. The second folding side portion can include a hole adjacent to the first folding side portion, such as the end of the second folding side portion that is adjacent to the tab on the first folding side portion, wherein the tab is configured to fit into the hole without folding when the first folding side portion is arranged perpendicular to the second folding side portion and the first folding side portion and the second folding side portion are each perpendicular to the body. The body can also include a plurality of cross members. The hole can be formed by cutting or punching the second folding side portion, the tab can be secured to the hole by one of glue, a staple, tape, epoxy, an adhesive, rubber cement or a clip, and the hole can be a trapezoid or other suitable shape (e.g. rectangle, square, parallelogram, rhombus, circle, ellipse, or irregular shape) having a first side that is parallel to a leading edge of the tab and a second side opposite the first side that is disposed at a non-parallel angle relative to the leading edge of the tab. In particular, this shape of the hole can allow the tab to be placed into the hole as the first folding side portion is folded from a position that is coplanar with the body to a position that is perpendicular to the body, such as by having a first side that is parallel to the leading of the tab when the tab is fully inserted into the hole, a second side that is adjacent to the first side and that has a length that is long enough to allow the tab to be placed within the hole without bending or folding (which typically requires more manual processing, or complex automated assembly mechanisms), a third side adjacent to the second side and opposite the first side that is disposed at an angle that is not parallel to the leading edge of the tab when it is fully inserted into the hole, and a fourth side that is opposite the second side and adjacent to the first side and the third side, where the length of the fourth side is shorter than the length of the second side, so as to secure the tab into position after it is fully inserted into the hole as shown in FIG. 3.

The method includes forming the tab in the first folding side portion that is attached to the body, such as by cutting a square portion from a corner of a piece of cardboard, paperboard, plastic or other suitable materials previously described herein, and then by cutting along a fold line between the first folding side portion and the second folding side portion. The hole in the second folding side portion that is attached to the body is formed by cutting, punching or otherwise removing the material from the board. The second folding side portion is then folded into a position that is approximately perpendicular to the body, such as shown in FIG. 3, where the position does not have to be exactly 90 degrees but can vary by an amount that is tolerated by the other relative dimensions of the frame, such as by +/−10 degrees. The first folding side portion is then folded to a position that is approximately perpendicular to the body and the second folding side portion, where the tab is slid into the hole as the first folding side portion is moved into position, such as by pressing gently down on the corner of the leading edge of the tab as it is placed over the hole, so that the corner can be tucked under the hole and can lead the rest of the tab into the hole without folding. This process is facilitated by the shape of the hole, as described herein. A plurality of cross-supports can be formed in the body, either before the folding operation, after the folding operation or at other suitable times. The tab can be secured to the second folding side portion to form a first frame support. A filter material can be placed on the body, and a second frame support can be secured to the first frame support to enclose the filter material.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A frame comprising:
   a first folding side portion attached to a body;
   a second folding side portion attached to the body adjacent to the first folding side portion;
   the first folding side portion further comprising a rectangular tab adjacent to the second folding side portion; and
   the second folding side portion further comprising a hole adjacent to the first folding side portion, wherein the rectangular tab is configured to fit into the hole without folding when the first folding side portion is arranged perpendicular to the second folding side portion and the first folding side portion and the second folding side portion are each perpendicular to the body.

2. The frame of claim 1 wherein the body further comprises a plurality of cross members.

3. The frame of claim 1 wherein the rectangular tab is formed by a cut located along a fold line between the first folding side portion and the body.

4. The frame of claim 1 wherein the rectangular tab is notchless and is formed by cutting a square from a corner of the first folding side portion and is separated from the second folding side portion by a single cut.

5. The frame of claim 1 wherein the hole is formed by one of cutting or punching the second folding side portion.

6. The frame of claim 1 wherein the rectangular tab is secured to the hole by one of glue, a staple, tape, epoxy, an adhesive, rubber cement or a clip.

7. The frame of claim 1 wherein the hole is a quadrilateral.

8. The frame of claim 1 wherein the hole is a trapezoid.

9. The frame of claim 1 wherein the hole is a trapezoid having a first side that is parallel to a leading edge of the tab and a second side opposite the first side that is disposed at a non-parallel angle relative to the leading edge of the tab.

10. A method of manufacturing a frame comprising:
    forming a rectangular tab in a first folding side portion that is attached to a body;
    forming a hole in a second folding side portion that is attached to the body;
    folding the second folding side portion to a position approximately perpendicular to the body;
    folding the first folding side portion to a position approximately perpendicular to the body and the second folding side portion; and
    wherein the rectangular tab is placed into the hole while folding the first folding side portion.

11. The method of claim 10 wherein forming the hole comprises forming a quadrilateral-shaped opening.

12. The method of claim 10 wherein forming the hole comprises forming a trapezoid-shaped opening.

13. The method of claim 10 wherein forming the hole comprises forming a trapezoid-shaped opening having a first side that is approximately parallel to a leading edge of the tab.

14. The method of claim 13 wherein forming the hole comprises forming the trapezoid-shaped opening having a second side that is opposite the first side and that is non-parallel to the leading edge of the tab.

15. The method of claim 10 further comprising forming a plurality of cross-supports in the body.

16. The method of claim 10 further comprising forming a plurality of cross-supports in the body by optimizing a distribution of support for a filter material based on a predetermined flow rate.

17. The method of claim 10 further comprising forming a plurality of cross-supports in the body by optimizing an air flow volume through a filter material.

18. The method of claim 10 further comprising securing the tab to the second folding side portion to form a first frame support.

19. The method of claim 18 further comprising:
placing a filter material on the body; and
securing a second frame support to the first frame support to enclose the filter material.

20. The method of claim 10 wherein wherein the tab is placed into the hole while folding the first folding side portion by sliding the tab along an outer surface of the second folding portion after it is folded into the position approximately perpendicular to the body so as to overlap a portion of the tab with a portion of the second folding portion, and then attaching the tab to the second folding portion using an attachment mechanism that is separate from the tab, and wherein the first folding side portion and the second folding side portion are each limited to a single fold.

* * * * *

UNITED STATES PATENT AND TRADEMARK OFFICE
CERTIFICATE OF CORRECTION

PATENT NO. : 9,561,457 B2  Page 1 of 1
APPLICATION NO. : 14/104959
DATED : February 7, 2017
INVENTOR(S) : Brent Chamberlain It is certified that error appears in the above-identified patent and that said Letters Patent is hereby corrected as shown below:

On the Title Page

1. Item (56), under "U.S. PATENT DOCUMENTS", in Column 2, Line 1, delete "Wharton" and insert -- Wharton et al. --, therefor.

In the Claims

2. In Column 5, Line 21, in Claim 20, delete "wherein wherein" and insert -- wherein --, therefor.

Signed and Sealed this
Thirtieth Day of May, 2017

Michelle K. Lee
*Director of the United States Patent and Trademark Office*